C. O. ANDERSON.
AGRICULTURAL MACHINE.
APPLICATION FILED OCT. 8, 1914.

1,163,194.

Patented Dec. 7, 1915.
3 SHEETS—SHEET 2.

Witnesses

Inventor
C. O. Anderson

By
Attorney

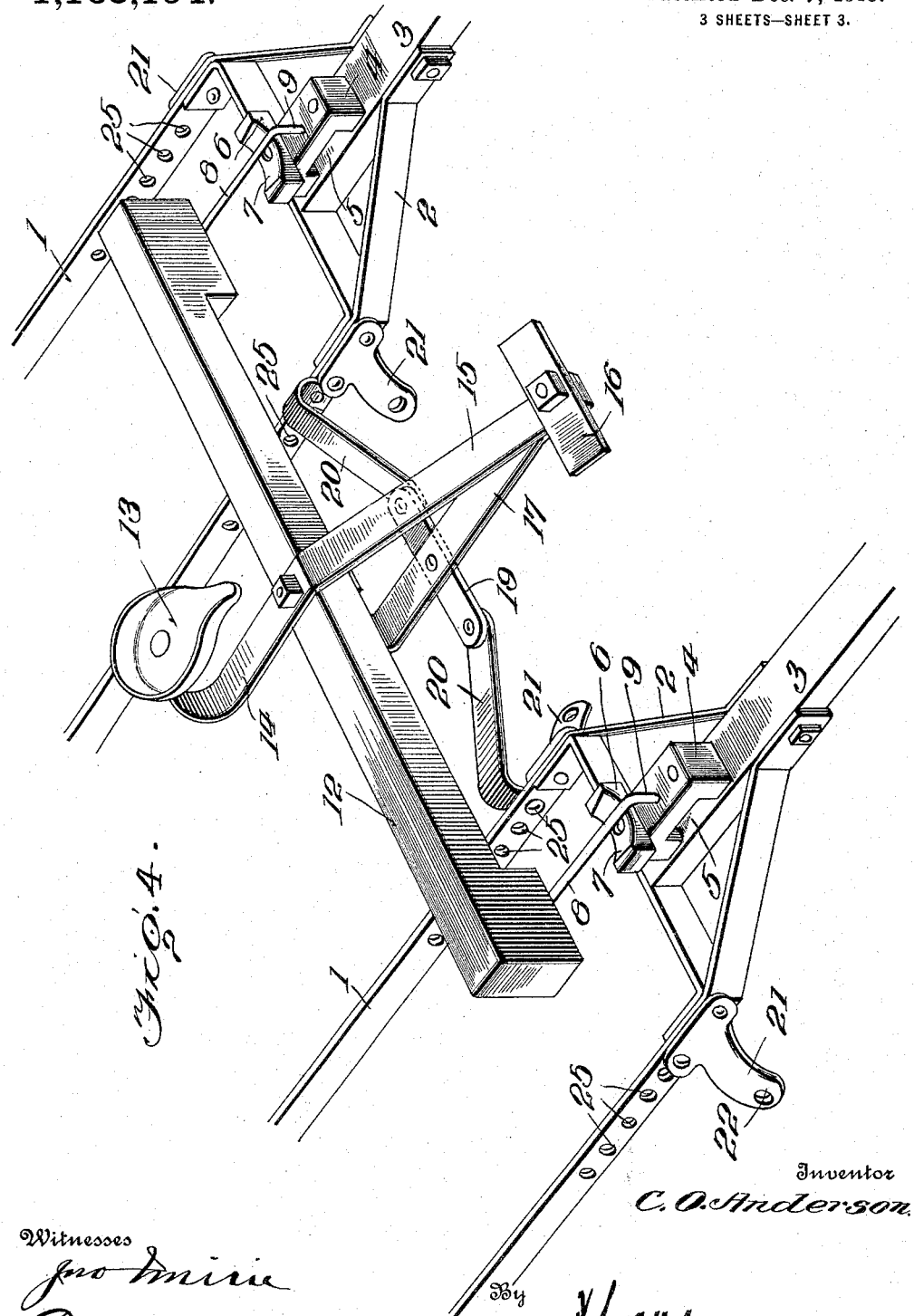

UNITED STATES PATENT OFFICE.

CHARLES O. ANDERSON, OF WATERVILLE, KANSAS.

AGRICULTURAL MACHINE.

1,163,194. Specification of Letters Patent. Patented Dec. 7, 1915.

Application filed October 8, 1914. Serial No. 865,738.

*To all whom it may concern:*

Be it known that I, CHARLES O. ANDERSON, citizen of the United States, residing at Waterville, in the county of Marshall and State of Kansas, have invented certain new and useful Improvements in Agricultural Machines, of which the following is a specification.

This invention relates to agricultural machinery and one object thereof is to provide means whereby two rows of plants may be cultivated simultaneously, the draft animals being driven between the rows.

A secondary object of the invention is to provide simple and efficient means whereby the driver may be seated between the ground treating implements and the seat and its support will be permitted to yield freely to the movements of the machines in traveling over uneven surfaces.

A further object of the invention is to provide means whereby the manipulation and adjustment of the several ground treating instrumentalities will be facilitated and also to provide a construction which will permit cultivators or planters to be readily brought into the operative position as may be desired.

Other objects of the invention will appear as the description of the same proceeds and the invention consists in certain novel features which will be particularly pointed out in the claims following the description.

Figure 1:
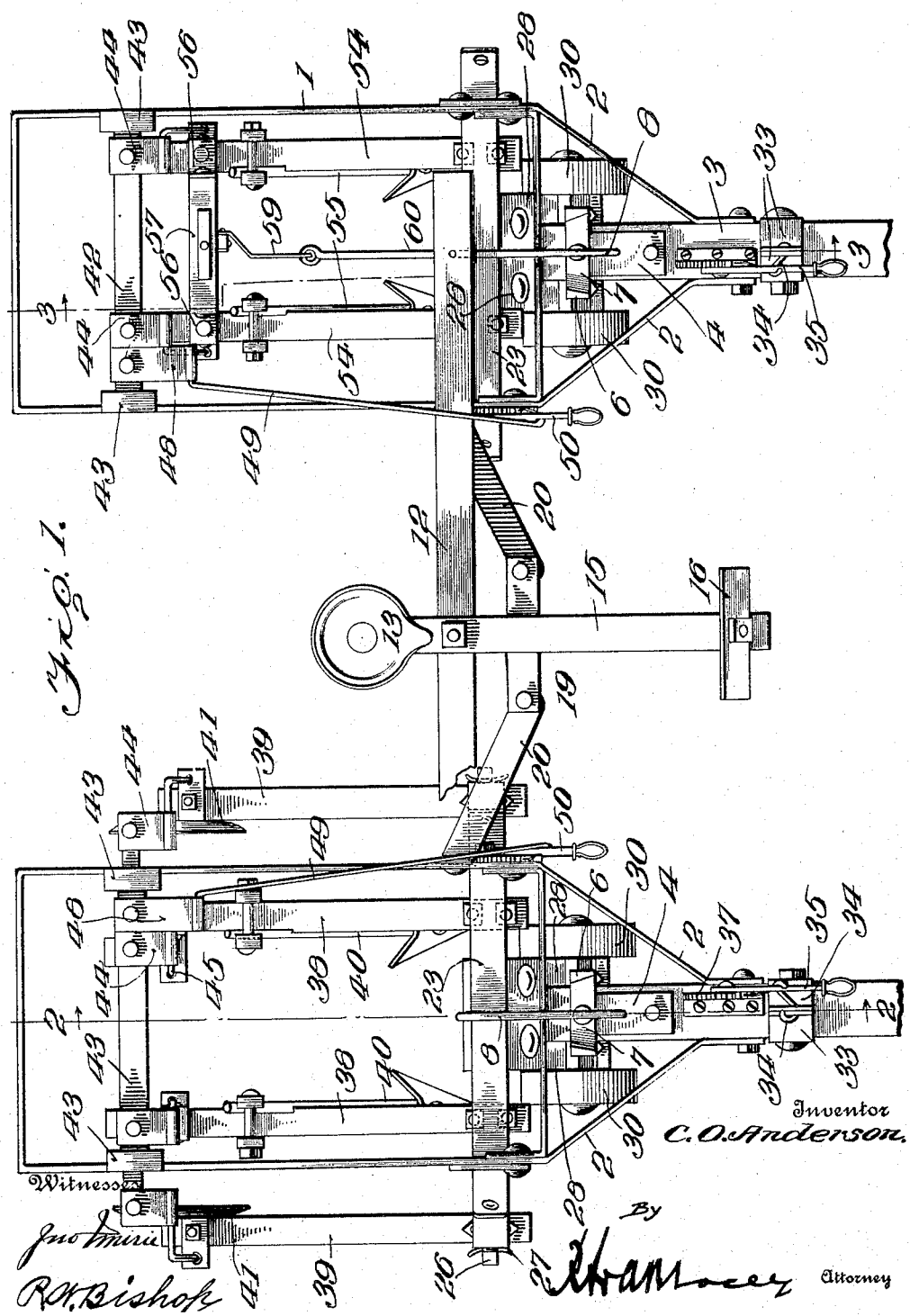
Figure 2:
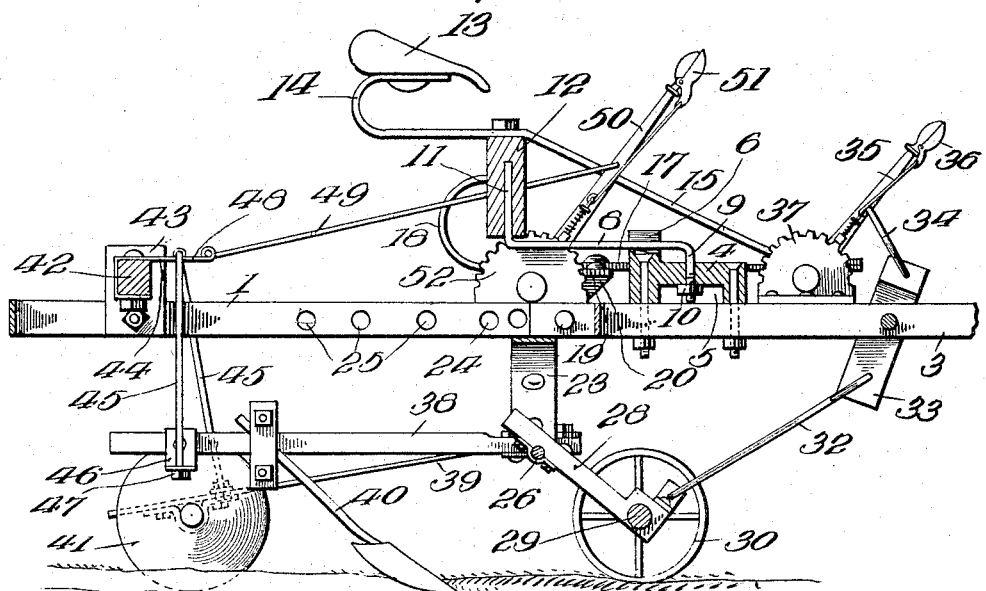
Figure 3:
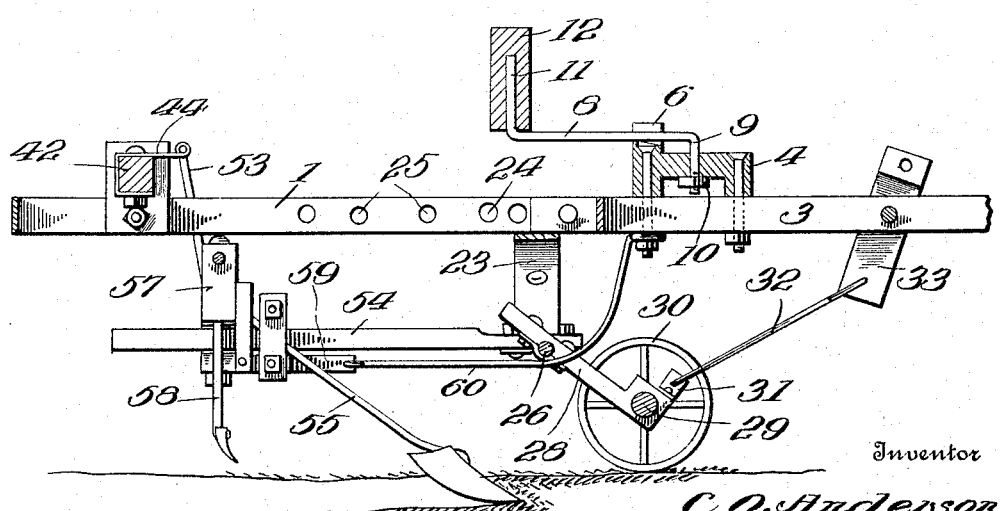

In the accompanying drawings, Figure 1 is a plan view of a machine embodying my improvements and showing a cultivator at one side and a combined cultivator and planter at the other side. Fig. 2 is a longitudinal section on the line 2—2 of Fig. 1. Fig. 3 is a longitudinal section on the line 3—3 of Fig. 1. Fig. 4 is an enlarged perspective view of the means employed to support the driver and couple two frames together.

In carrying out my invention, I employ a substantially rectangular frame 1 having forwardly converging braces 2 at its front end which have their front ends secured rigidly to a tongue 3. Upon the upper side of the tongue at the rear end thereof, I secure a pivot block 4 which is recessed upon its underside, as clearly shown at 5, and is provided on its upper side at its rear end with a saddle 6 having a concave recess 7 in its upper face. A supporting rod 8 extends over the saddle 6 and plays in the concave recess thereof and has its front end 9 turned downwardly and pivotally mounted in the block 4, as clearly shown, a nut or other retaining device 10 being fitted on the lower extremity of this down-turned portion 9 to prevent accidental withdrawal of the supporting rod. The rear end of the supporting rod 8 is turned upwardly, as shown at 11, and engages a socket in the under side of a coupling bar 12 which extends over and between two frames 1, each of said frames 1 being provided with the described supporting means and the coupling bar 12 forming a connection between the two supporting rods.

The driver's seat 13 is supported upon a spring standard 14 which is secured rigidly to the coupling bar 12 at the center of the same and has an extension 15 projecting in advance of the coupling bar and carrying a foot rest 16 at its forward end. A brace 17 extends rearwardly from the foot rest and has its rear end curved upwardly, as shown at 18, and secured to the under side of the coupling bar at the center of the same, as shown. This brace 17 passes over and is secured to a cross bar 19 to the ends of which are secured springs 20 extending therefrom to the sides of the frames 1 where they are secured.

It will be readily understood that as the machines are drawn over the field the frames 1 will follow their respective paths but cannot diverge from each other inasmuch as the bar 19 and the springs 20 will serve to retain them in their relative positions. At the same time a limited lateral movement of each frame is permitted so that large obstructions may be passed or one frame may ride through a hollow while the other frame is on a level surface without discomfort to the driver whose seat will be cushioned through the action of the springs 20 and the rear curved end of the bar 17. The springs 20 will also tend to restore the frames to their normal positions after either frame has passed around or over an obstruction. The pivotal mounting of the supporting rods 8 will permit the coupling bar 12 to move laterally relative to the frames without being disconnected therefrom and the saddles 6 will not only serve to support the said rods 8 so as to prevent excessive binding thereof but will also tend to maintain the coupling bar in a horizontal position owing to the curvature or concavity of the seats 7 in the saddles.

At the front end of each frame 1 and on each side of the frame, I secure brackets 21 which extend outwardly and downwardly from the sides of the frame and are provided with openings 22 through which securing bolts may be passed to secure an arched bar 23 when the ground treating implements illustrated in Fig. 1 are to be used. These brackets 21 are located just in advance of the openings 24 through which the securing bolts for the springs 20 are inserted and other openings 25 are provided in the side bars to permit the attachment of various instrumentalities according to the use to which the machine is to be put. The arched bar 23 extends below the frame 1 and beyond the sides of the same, the ends of the said arched bar being secured to the brackets 21 and projected downwardly beyond the same and provided with suitable openings through which a rod 26 is inserted. The said rod is secured against endwise movement by cotter-pins 27 or other well known means as will be readily understood. The said rod 26 constitutes a support for the hangers 28 in the lower ends of which is mounted an axle 29 carrying ground wheels 30 and on the said hangers at the lower ends thereof are lugs 31 which are pivotally engaged by the rear ends of links 32 extending up to vibratory bars 33 fulcrumed on the tongue 3, as shown in Figs. 2 and 3. The upper ends of the vibratory bars 33 are connected by a link 34 to an operating lever 35 which is suitably mounted upon the tongue and is equipped with the usual latch 36 adapted to engage a rack 37 and thereby hold the lever in a set position.

The parts should be so proportioned that the levers 35 will be within convenient reach of the driver upon the seat 13 so that either or both sets of ground wheels may be readily adjusted as occasion may require. In the arrangement shown in Fig. 2 and at the left in Fig. 1 the rod 26 supports the front ends of beams 38 and 39 which are fitted loosely upon the rod so as to have a pivotal movement about the same. The beams 38 carry shovel plows or cultivators 40 while the beams 39 are equipped at their rear ends with disk cultivators 41 and the rear ends of both sets of beams are connected to a rock shaft 42 which is journaled in suitable brackets 43 secured upon the side bars of the frame 1. The said rock shaft is equipped with forwardly projecting crank arms 44 provided with eyes at their front ends to receive the upper ends of links 45 which have their lower ends playing loosely in brackets 46 secured to and projecting laterally from the beams and suitable stops 47 are provided on the lower extremities of the said links below the said brackets as shown. It will thus be readily seen that if the shaft 42 be rocked the links 45 will be raised or lowered so as to permit the shovels 40 or the disk 41 to run at any desired depth below the surface while at the same time, should the disk or shovel strike a large rock or other obstruction the beam carrying the disk or the shovel may ride upwardly upon the link suspending the same until the obstruction is cleared.

To set the rock shaft so as to permit the disk or the shovel to run at the desired depth, I provide a crank arm 48 on the shaft near the inner end thereof and this crank arm is connected by a link 49 with an operating lever 50 which is fulcrumed upon the inner side of the frame near the front end thereof so as to be easily reached by the driver. This lever is, of course, equipped with the usual latch device, indicated at 51, adapted to engage a holding rack or segment 52 on the frame so as to retain the rock shaft and the ground treating implements in a set position.

It will be understood that each frame 1 is equipped with a similar lever 50 to manipulate the rock shaft 42 at the rear end of the frame and that each lever will be arranged upon the inner side bar of the frame so that the driver may adjust the implements at either side of the line of travel without dismounting.

In the arrangement illustrated in Fig. 3 and at the right of Fig. 1 the inner crank arms 44 on the rock shaft 42 are engaged by links 53, the lower ends of which support beams 54 having their front ends pivotally mounted upon the rod 26 and carrying shovel plows or cultivators 55 corresponding to the beams 38 and the plows 40 shown in Fig. 2. The said beams 54, however, in this arrangement are provided with upstanding brackets 56 to and between which, I may secure a seed box 57 having a seed tube 58. A draft bar 59 extends forwardly from the brackets 56 between the beams 54 and has its front end pivotally attached to the rear end of a draw bar 60 which extends forwardly beyond the rod 26 and is then carried upwardly to the tongue 3 to which it is rigidly secured.

The downwardly and outwardly projecting brackets 21 which are secured to the sides of the frames near the front ends thereof adapt the frames to support various ground treating implements. The arched bar 23 may be dispensed with in some cases and a cross bar extended between the said brackets to support the front ends of plow or cultivator beams, and shovels, harrow teeth or similar implements may be carried by said cross bar. Fenders may be secured directly to the brackets or other advantageous use made of the brackets.

Having thus described the invention, what is claimed as new is:—

1. The combination of a pair of frames, ground treating implements carried by said frames, a coupling bar connected to each of said frames and extending transversely between the same and movable laterally with respect thereto, resilient connections between the two frames below the coupling bar and a connection between the said resilient connections and the coupling bar.

2. The combination of a pair of frames, ground treating implements carried thereby, supporting rods pivotally mounted at their front ends upon the frames, a coupling bar pivotally fitted to the rear ends of the said supporting rods, and saddles on the frames in rear of the pivots of said supporting rods and having seats in which said rods play.

3. The combination of a pair of parallel frames, leaf springs secured to the inner sides of said frames and projecting therefrom toward each other, a cross bar connecting the inner ends of the springs and a coupling bar disposed above said springs and cross bar and connected therewith.

4. The combination of a pair of frames, independent draft devices attached one to each of said frames, and a coupling bar extending transversely between the frames and supported at its ends upon the frames and freely movable laterally relative thereto.

5. The combination of a pair of frames, ground treating implements carried by said frames, supporting rods pivoted at their front ends on the frames, a coupling bar pivotally fitted to the rear ends of said bars, springs secured to the sides of the frames below the coupling bar, a cross bar connecting the inner ends of the said springs, and seat carrying brackets secured to the said cross bar and the coupling bar.

6. The combination of a frame, an arched bar secured to the said frame near the front end thereof, a supporting rod carried by the ends of said bar, hangers loosely fitted upon the said rod, ground wheels carried by said hangers, vibratory bars mounted on the frame in advance of said hangers, links connecting the lower ends of said bars with the hangers, and means on the frame connected to the upper ends of said bars vibrate the same.

7. The combination of a frame, a transverse rod carried by the front end of the frame, a rock shaft mounted on the rear end of the frame, beams pivotally fitted at their front ends on the said transverse rod, brackets secured to and projecting from the said beams, crank arms on the rock shaft, hangers connected to said crank arms and having their lower ends extending through the brackets on the beams, stops on said hangers below said brackets, and means on the frame for adjusting the rock shaft.

8. The combination of a frame, a transverse rod carried by the front end of the frame, beams pivotally fitted at their front ends on said rod, means on the frame connected with the rear ends of the beams for vertically adjusting the same, a draft bar connected with the rear ends of the beams and extending forwardly therefrom, and a draw bar pivotally connected to the front end of the draft bar and having its front end rigidly secured to the frame.

In testimony whereof I affix my signature in presence of two witnesses.

CHARLES O. ANDERSON. [L. S.]

Witnesses:
  J. N. THURMAN,
  B. R. TALBOT.

Copies of this patent may be obtained for five cents each, by addressing the "Commissioner of Patents, Washington, D. C."